UNITED STATES PATENT OFFICE.

JNO. JOS. CHAS. SMITH, OF PHILADELPHIA, PENNSYLVANIA.

MODE OF CONSTRUCTING MATRICES, &c.

Specification forming part of Letters Patent No. 25,533, dated September 20, 1859; Reissue No. 943, dated April 10, 1860.

*To all whom it may concern:*

Be it known that I, JOHN JOSEPH CHARLES SMITH, of Philadelphia, State of Pennsylvania, formerly of Covington, Kenton county, State of Kentucky, have invented a new and useful mode for making matrices, molds, dies, &c., with or without counterparts, for pressing and stamping figures or designs on metals—such as gold, silver, copper, &c.—and also on leather, gutta-percha, &c. Further, for making seals and counters for the same, thus doing away, to a considerable extent, with the mode of engraving.

This invention possesses, further, the capacity to enable me to manufacture printing-type of any size in hardness equal to steel.

The nature of my invention is to render the alloy of copper and tin (which is in its natural state as hard as steel and of considerable strength, when composed out of seventeen parts copper and seven parts of clear tin, and which possesses its greatest strength at this rate of mixture, as far as concerns pressure) pliable, soft, and in such a state as to admit an easy and perfect impression of any design, figure, or mold, if the designs, figures, models, or objects are made of or engraved of a metal which melts at a high degree of heat—such as gold, silver, copper, brass, &c.—by thus producing a perfect mold, matrix, or die; and, further, does this invention, in connection with the art of electrotyping, enable me to confer an already-existing figure or designs on or of a soft metal or other substance into or on the hard composition of copper and tin.

To enable others skilled in the arts to use and make my invention, I will proceed to describe its construction and operation.

I will first describe the mixtures of the alloy. The copper ought to be melted when the tin is added to it, and both of the metals have to be clear to produce a hard and good alloy. Slight mixtures of other metals or ingredients will not destroy the property of the alloy to render it soft and pliable, but some will diminish the said quality, as well as its hardness and strength. If the alloy is composed of a larger quantity of copper, as already stated, the alloy will be softer. If more tin is added, it will be more hard and brittle.

To make molds, matrices, or dies will be done in this manner: For instance, I wish to make a die for the manufacturing of jewelry-ware—will say a breast-pin. To do this I obtain a copy of such pin by means of electrotyping. This copy is then filled on the hollow rear side with the composition of equal parts of copper, zinc, and antimony, or common brass, which must be melted with the blow-pipe, so as to strengthen the copy to resist some pressure. Plaster-of-paris will answer the purpose of strengthening in many cases. The copy is further attached to an iron plate by means of paste to keep it from moving, and then covered with lamp-black by suspending it over a burning tallow-candle, and is by this prepared for further process. I then take a block of the alloy of copper and tin of the size and shape the matrix or die shall have. This block is then put into a strong wrought or cast iron frame, which collar or frame has the purpose to keep the alloy from expanding while the necessary pressure is applied. The block of alloy, with the collar around it, is then placed into a fire and brought to a red heat, which renders the alloy of copper and tin pliable and soft, like soft lead or wax. It is then taken out of the fire, placed on the prepared copy, which must be first heated, set under a screw or lever press fit for such purpose, and a sufficient pressure applied, and a most perfect and sharp impression of the copy will be obtained. When cold, the ready matrix or die may be easily removed from the collar.

By large pieces of deep-engraved or high-elevated figures or designs it is necessary to cast the alloy of copper and tin first on the object from which an impression is to be obtained, so as to receive partly the impression of the design, thus rendering a further process more ready and easy. It is further necessary to cover the object from which a mold or die is to be obtained with lamp-black by holding over a burning tallow-candle, so as to prevent the object or mold from uniting with the alloy of copper and tin when the pressure is applied.

In the art of making seals this mode may be applied: The design of the seal may be molded in wax or soft metals. A copy of such seal is then obtained by electrotyping. Otherwise the same mode of operations will be observed as already described. A perfectly good counterpart to a seal may be obtained of the alloy of copper and tin by pressing the alloy on the ready seal while red-hot and soft, and in such manner as already described.

The making of mold-plates for pressing figures on leather, gutta-percha, paper, and sheet metals, &c., is accomplished in almost the same manner. I take one or more copies of an original plate with fine designs by electrotyping, strengthen, and prepare this copy in the manner already described. Then I take a plate of the alloy of copper and tin, of the size and shape the mold-plate shall have. I put this plate into a strong wrought or cast iron frame or collar, so as to keep the alloy from expanding while soft and under pressure, place, then, the whole into the fire and make it red-hot, to render the alloy soft, place it then over the copy from which I wish to obtain a mold-plate, bring the whole under a press, apply the pressure, and the mold-plate is done.

In this as well as in all other new things or inventions a man must get a little practice; must also know how to construct a good mold or model for this purpose, either by means of electrotyping or otherwise, and he will be able to make numerous articles, dies, molds, rolls for rolling, ornamental works, &c., out of the alloy of copper and tin, which will be in many cases just as good as steel, and save the great and expensive work of engraving and cutting such tools and articles.

The main and general rules to make this invention are:

First. Cast the alloy of the size and shape which the article, mold, die, matrix, &c., may get.

Second. Prepare a good model, by means of electrotyping or otherwise, out of a metal which melts at a high degree of heat, or of the same alloy of copper and tin.

Third. The alloy must in all cases be surrounded by a collar, frame, or cylinder, so as to keep the alloy from expanding while under pressure. If a mold in which the alloy is to be pressed is of such a construction, the collar is not necessary.

The manufacturing of printing-type out of an alloy of copper and tin (when even mixed with other metals or ingredients in a slight degree) will be done in this way. The type-mold may be constructed in this manner: A steel plate in thickness equal to the length of printing-type is made by composing a number of thin steel plates with a number of grooves in each from the size of printing-type, forming, when composed, a plate with square holes from the size of a printing-type. Under this in such manner composed plate, another metallic plate is fixed, with the matrices of letters stamped into it exactly corresponding with the square holes of the first plate, forming in this manner a number of perfect type-molds. These two plates are then bound by an iron collar or frame, which collar or frame is about two inches higher than the two plates are both in thickness, so that the frame will form a box above the surface of the plate with the square holes in it. A block of the alloy of copper and tin (in thickness one and a half inch, and of the size of the mold-plates) is then made pliable and soft like wax by making it red-hot and bringing it near to the point of melting, is then laid in the box and on the composed plate with the square holes, and forced by applying pressure into every type-mold, receiving a perfect sharp impression of such molds, and producing a number of types at one operation. When cold, they may be easily removed from the molds to undergo the further necessary operations.

What I claim as my invention, and desire to secure by Letters Patent, is—

1. To render an alloy of copper and tin (when even mixed with other metals or ingredients) pliable, soft, and in such a state as to admit of an easy and perfect impression of any proper design, figure, mold, or object of or on metal, this figure, design, or mold may be engraved or be produced by the art of electrotyping as a copy of any design or figure, thus yielding and producing a perfect mold, matrix, or die.

2. The discovery that the alloy of copper and tin possesses the property to be pliable, soft, almost like wax when under a red heat, and enabling us to press it into any proper mold, and that this alloy will receive a perfect and sharp impression of such mold, article, or design while under a red heat, without applying a great power in pressing.

3. In connection, to manufacture printing-type out of the alloy of copper and tin (when even mixed with other metals or ingredients) by rendering the alloy so pliable and soft by fire that it may be forced into any type-mold by applying pressure, receiving a perfect impression of such mold, and in the mode already described.

In testimony whereof I have hereunto signed my name before two subscribing witnesses.

JOHN JOS. CH. SMITH.

Witnesses:

GEO. PATTEN,

JOHN S. HOLLINGSHEAD.